Patented Dec. 2, 1924.

1,518,051

UNITED STATES PATENT OFFICE.

ARTHUR GILBERT DANDRIDGE AND JOHN THOMAS, OF CARLISLE, ENGLAND, ASSIGNORS TO SCOTTISH DYES LIMITED, OF CARLISLE, CUMBERLAND, ENGLAND.

MANUFACTURE OF DYESTUFFS OF THE ANTHRAQUINONE SERIES.

No Drawing. Application filed June 5, 1922. Serial No. 566,143.

*To all whom it may concern:*

Be it known that we, ARTHUR GILBERT DANDRIDGE and JOHN THOMAS, both subjects of the King of Great Britain and Ireland, and both residing at Murrell Hill Works, Carlisle, in the county of Cumberland, England, have invented certain new and useful Improvements in and Relating to the Manufacture of Dyestuffs of the Anthraquinone Series, of which the following is a specification.

This invention relates to the production of dyestuffs and intermediates of the anthraquinone series.

In the course of a prolonged investigation we have found that if inorganic alkali reducing salts are added to the fusion melt of 2-amino-anthraquinone and caustic potash, a marked improvement in the yield of N-dihydro-1:2:2':1'-anthraquinone-azine is obtained.

The inorganic salts which give these improved results are capable of acting as reducing agents and amongst those which we have found to be useful for this purpose are cyanides, sulphides and ferro-cyanides of the alkali metals.

Our invention therefore consists in the employment in connection with the fusion melt of 2-amino-anthraquinone or its derivatives and caustic potash or other alkali of inorganic salts which are capable of acting as reducing agents.

The invention also consists in the improved processes herein described.

In carrying the invention into effect in one form by way of example, 350 parts of caustic potash are melted in a stirrer vessel and at 180° C. 95 parts potassium sulphide are added; the mixture is then raised to 200° C. and 50 parts of 2-amino-anthraquinone added. The temperature of the whole mass is then raised to 220–240° C. and kept there for thirty minutes. It is then poured into 2500 parts of water and thoroughly boiled to precipitate all the dyestuff. The liquor is then filtered and the paste washed with water.

The yield of dyestuff is 22 parts.

A strictly comparable test of a fusion carried out with caustic potash alone gave 16 parts of dyestuff.

Although it is preferred to carry out the process as described above if desired the potassium sulphide and the caustic potash may first be mixed and then the 3-amino-anthraquinone added.

In this specification and in the claims where reference has been made to N-dihydro-1:2:2':1'-anthraquinone-azine this includes the derivatives thereof and where reference has been made to 2-amino-anthraquinone this also includes its derivatives.

Having now described our invention, what we claim as new and desire to secure by Letters Patent is:—

1. A method for the production of N-dihydro-1:2:2':1'-anthraquinone-azine which consists in the fusion of 2-amino-anthraquinone, an alkali and a reducing alkali salt.

2. A method for the production of N-dihydro-1:2:2':1'-anthraquinone-azine which consists in the fusion of 2-amino-anthraquinone, caustic potash and an alkali sulphide.

3. A method for the production of N-dihydro-1:2:2':1'-anthraquinone-azine which consists in the fusion of 2-amino-anthraquinone, an alkali and potassium sulphide.

4. A method for the production of N-dihydro-1:2:2':1'-anthraquinone-azine which consists in subjecting caustic potash to a temperature of about 180° C., adding potassium sulphide thereto with stirring, raising the temperature to about 200° C., adding 2-amino-anthraquinone thereto, raising the temperature of the mass to about 230° C., maintaining it at that temperature for about 30 minutes, pouring the melt into water, boiling the liquor and then separating the dyestuff formed.

In testimony whereof we have signed our names to this specification.

ARTHUR GILBERT DANDRIDGE.
JOHN THOMAS.